(12) United States Patent
Yan et al.

(10) Patent No.: US 11,704,139 B2
(45) Date of Patent: Jul. 18, 2023

(54) SERVICE PROCESSING METHOD AND APPARATUS, ELECTRONIC DEVICE, AND STORAGE MEDIUM

(71) Applicant: INSPUR SUZHOU INTELLIGENT TECHNOLOGY CO., LTD., Jiangsu (CN)

(72) Inventors: Dongdong Yan, Jiangsu (CN); Lanhai Zuo, Jiangsu (CN); Yi Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/907,785

(22) PCT Filed: Jan. 7, 2021

(86) PCT No.: PCT/CN2021/070634
§ 371 (c)(1),
(2) Date: Aug. 29, 2022

(87) PCT Pub. No.: WO2021/169623
PCT Pub. Date: Sep. 2, 2021

(65) Prior Publication Data
US 2023/0126437 A1 Apr. 27, 2023

(30) Foreign Application Priority Data
Feb. 29, 2020 (CN) .......................... 202010132411.1

(51) Int. Cl.
*G06F 9/54* (2006.01)
*G06F 9/451* (2018.01)
*G06F 9/48* (2006.01)

(52) U.S. Cl.
CPC .............. *G06F 9/451* (2018.02); *G06F 9/485* (2013.01); *G06F 9/54* (2013.01); *G06F 2209/545* (2013.01)

(58) Field of Classification Search
CPC ........................................................ G06F 9/54
See application file for complete search history.

(56) References Cited

U.S. PATENT DOCUMENTS 11,216,506 B1 * 1/2022 Ranzinger ............... G06F 16/56
2007/0239766 A1 10/2007 Papaefstathiou et al.
(Continued)

FOREIGN PATENT DOCUMENTS

CN 103065221 A 4/2013
CN 107133324 A 9/2017
(Continued)

OTHER PUBLICATIONS

International Search Report of corresponding PCT application PCT/CN2021/070634, dated Apr. 8, 2021, 6 pages.
(Continued)

*Primary Examiner* — Charlie Sun
(74) *Attorney, Agent, or Firm* — Cooper Legal Group, LLC

(57) ABSTRACT

Disclosed are a service processing method and apparatus, an electronic device, and a computer-readable storage medium. The method includes: when receiving a User Interface (UI) request, creating a process instance corresponding to the UI request, and storing instance information of the process instance in a storage module (S101); determining a target process instance from the storage module, and determining a step to be executed of the target process instance based on target instance information of the target process instance (S102); searching, from a register, and executing a target method corresponding to the step to be executed, wherein
(Continued)

When receiving a UI request, create a process instance corresponding to the UI request, and store instance information of the process instance in a storage module — S101

Determine a target process instance from the storage module, and determine a step to be executed of the target process instance based on target instance information of the target process instance — S102

Search, from a register, and execute a target method corresponding to the step to be executed, wherein the register includes all methods compiled according to a preset development specification — S103 the register includes all methods compiled according to a preset development specification (S103).

20 Claims, 2 Drawing Sheets

(56) References Cited

U.S. PATENT DOCUMENTS

2018/0101382 A1* 4/2018 Goel .................... G06F 9/46
2019/0166209 A1   5/2019 Mueller et al.

FOREIGN PATENT DOCUMENTS

| CN | 108182120 A | 6/2018 |
| CN | 110032571 A | 7/2019 |
| CN | 110244990 A | 9/2019 |
| CN | 110457382 A | 11/2019 |
| CN | 110737533 A | 1/2020 |
| CN | 111309294 A | 6/2020 |
| WO | 2017045473 A1 | 3/2017 |

OTHER PUBLICATIONS

Written Opinion of International Searching Authority of corresponding PCT application PCT/CN2021/070634, dated Apr. 8, 2021, 4 pages.

* cited by examiner

SERVICE PROCESSING METHOD AND APPARATUS, ELECTRONIC DEVICE, AND STORAGE MEDIUM

This application claims priority to Chinese Patent Application No. 202010132411.1, filed on Feb. 29, 2020, in China National Intellectual Property Administration and entitled "Service Processing Method and Apparatus, Electronic Device, and Storage Medium", the contents of which are hereby incorporated by reference in its entirety.

FIELD

The present application relates to the technical field of computers, and more particularly to a service processing method and apparatus, an electronic device, and a computer-readable storage medium.

BACKGROUND

In a cloud platform or virtual platform environment, operations cost much time, and some task records are also needed. Against this background, an intermediate platform is definitely needed to process and transfer a User Interface (UI) request sent by a page to background for execution such that the front-end page needs not to wait.

Currently, the proximate prior art is using Activiti, an open-source workflow framework, whose process development implements the operation of service processes mainly based on Extensible Markup Language (XML). The framework has rich and powerful functions, but is bulky and difficult to maintain and extend for a cloud platform. Moreover, an XML-based service process of the framework is quite poor in readability and debugging performance, which is unfavorable for subsequent maintenance.

Therefore, how to improve the readability of a service process is a technical problem needed to be solved by those skilled in the art.

SUMMARY

An objective of the present application is to provide a service processing method and apparatus, an electronic device, and a computer-readable storage medium, thereby improving the readability of a service process.

In order to achieve the above objective, the present application provides a service processing method, including:

when receiving a UI request, creating a process instance corresponding to the UI request, and storing instance information of the process instance in a storage module;

determining a target process instance from the storage module, and determining a step to be executed of the target process instance based on target instance information of the target process instance;

searching, from a register, and executing a target method corresponding to the step to be executed, wherein the register includes all methods compiled according to a preset development specification.

After the creating a process instance corresponding to the UI request, the method further includes:

setting an execution state of the process instance to a ready state;

Correspondingly, the determining a target process instance from the storage module includes:

determining the target process instance according to the execution state of the process instance in the storage module.

The instance information includes execution time. The determining the target process instance according to the execution state of the process instance in the storage module includes:

determining a process instance whose execution state is the ready state and whose corresponding execution time is reached in the storage module as the target process instance.

After the searching, from a register, and executing a target method corresponding to the step to be executed, the method further includes:

judging whether the target method is a last step of the target process instance;

if NO, updating the target instance information based on a next step of the target method, and restoring the target instance information in the storage module.

The method further includes:

if the target method is the last step of the target process instance, judging whether the target method is executed successfully;

if YES, setting an execution state of the target process instance to a completed state;

if NO, setting the execution state of the target process instance to an error state.

The searching, from a register, and executing a target method corresponding to the step to be executed includes:

searching, from the register, the target method corresponding to the step to be executed, setting an execution state of the target process instance to an executing state, and executing the target method;

during the execution of the target method, if another method needs to be called asynchronously, setting the execution state of the target process instance to a waiting state.

The method further includes:

during the execution of the target method, if receiving an interrupt signal, setting the execution state of the target process instance to the ready state, and restoring the target instance information in the storage module.

In order to achieve the above objective, the present application provides a service processing apparatus, including:

a storage module, configured to, when receiving a UI request, create a process instance corresponding to the UI request, and storing instance information of the process instance in a storage module;

a determination module, configured to determine a target process instance from the storage module, and determine a step to be executed of the target process instance based on target instance information of the target process instance;

an execution module, configured to search, from a register, and execute a target method corresponding to the step to be executed, wherein the register includes all methods compiled according to a preset development specification.

In order to achieve the above objective, the present application provides an electronic device, including:

a memory, configured to store a computer program;

a processor, configured to execute the computer program to implement the steps of the service processing method as described above.

In order to achieve the above objective, the present application provides a computer-readable storage medium, having a computer program stored which, when executed by a processor, implements the steps of the service processing method as described above.

It can be seen from the above solutions that the present application provides a service processing method, including: when receiving a UI request, creating a process instance corresponding to the UI request, and storing instance information of the process instance in a storage module; determining a target process instance from the storage module, and determining a step to be executed of the target process instance based on target instance information of the target process instance; searching, from a register, and executing a target method corresponding to the step to be executed, wherein the register includes all methods compiled according to a preset development specification.

According to the service processing method provided in the present application, the preset development specification defined in the register only serves a workflow, does not carry other characteristic functions, and is simple, feasible, and reliable. Codes developed according to the specification are highly readable and maintainable. A service rather than code layering is taken as a guidance, whereby a whole service process is clear and easy to understand, a retry mechanism, a concurrent and repeated scheduling prevention mechanism, and an interrupt mechanism may be satisfied, and relatively high extensibility is ensured. The present application also discloses a service processing apparatus, an electronic device, and a computer-readable storage medium, which may also achieve the foregoing technical effects.

It is to be understood that the above general description and the following detailed description are only exemplary and not intended to limit the present application.

BRIEF DESCRIPTION OF THE DRAWINGS

In order to describe the technical solutions in the embodiments of the present application or the conventional art more clearly, the drawings needed to be used in descriptions about the embodiments or the conventional art will be simply introduced below. It is apparent that the drawings described below are merely some embodiments of the present application. Other drawings may further be obtained by those of ordinary skill in the art according to these drawings without creative work. The drawings, which constitute a part of the specification, are used to provide further understandings of the present disclosure and explain, together with the following specific implementation modes, the present disclosure and not intended to form limitations on the present disclosure. In the drawings.

DETAILED DESCRIPTION

The technical solutions in the embodiments of the present application will be clearly and completely described below with reference to the accompanying drawings in the embodiments of the present application. Obviously, the described embodiments are only a part of the embodiments of the present application, rather than all the embodiments. Based on the embodiments of the present application, all other embodiments obtained by those skilled in the art without creative work shall fall within the protection scope of the present application.

The embodiments of the present application disclose a service processing method, thereby improving the readability of a service process.

Figure 1:
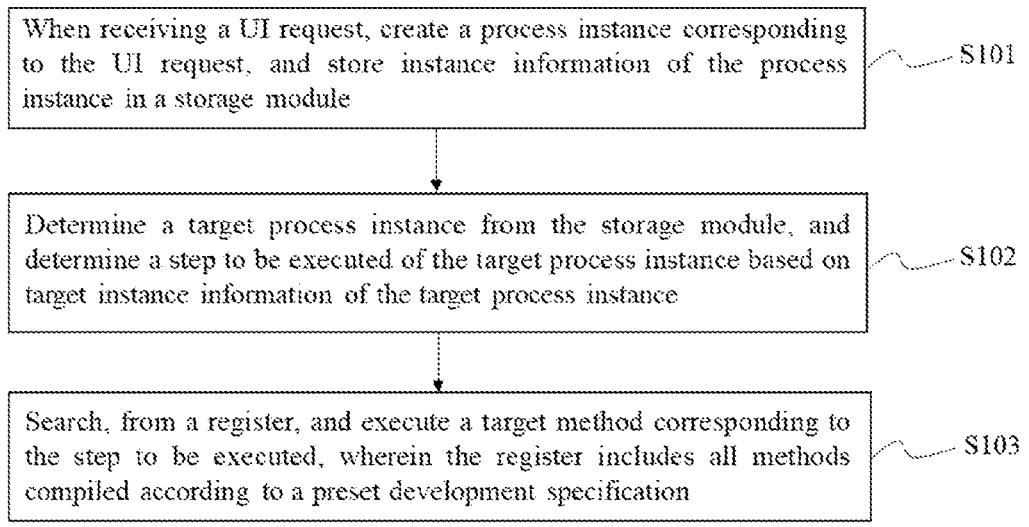
FIG. 1 is a flowchart of a service processing method according to an exemplary embodiment.

Referring to FIG. 1, a flowchart of a service processing method according to an exemplary embodiment is shown. As shown in FIG. 1, the method includes the following steps.

S101: when receiving a UI request, create a process instance corresponding to the UI request, and store instance information of the process instance in a storage module.

An execution body of the present embodiment is an intermediate platform between a front-end page and a background, which may be applied to a cloud platform, a virtual platform environment, and other application scenarios for a purpose of scheduling a UI request sent by the front-end page to ensure ordered processing of the background and avoiding the front-end page waiting. During specific implementation, a development specification is defined first in a register, including that a process instance name or class name needs to inherit a specific interface, a name includes a special word, etc., to indicate that the program code belongs to the same process instance. For a step to be executed or skipped in a method, a specific annotation needs to be added or the name needs to include a special word. Codes of all methods are stored in the register. The methods in the same process instance have a globally unique identifier, thereby preventing skip to wrong processes.

In this step, a process instance is created according to a UI request sent by the front-end page. Instance information includes a next step of a process, context information, etc., an execution state defaults to the ready state, and the process instance may be scheduled and executed. The instance information needs to be stored in a storage module. That is, after creating a process instance corresponding to the UI request, the method further includes: setting an execution state of the process instance to a ready state.

S102: determine a target process instance from the storage module, and determine a step to be executed of the target process instance based on target instance information of the target process instance.

In this step, the instance information is read from the storage module so as to determine a target process instance. Specifically, the target process instance may be determined according to the execution state of the process instance in the storage module. Only a process instance that is in the ready state and whose execution time is reached is read. That is, a process instance whose execution state is the ready state and whose corresponding execution time is reached in the storage module is determined as the target process instance.

During specific implementation, an execution state of the target process instance is set to a running state to prevent repeated scheduling, and the target process instance is sent to an execution queue for execution in queue. An execution module reads, from the queue, and executes the process, and determines a step to be executed of the target process instance according to target instance information of the target process instance.

S103: search, from a register, and execute a target method corresponding to the step to be executed, wherein the register includes all methods compiled according to a preset development specification.

In this step, a target method corresponding to the step to be executed is searched from a register and called for execution. In the target method, a task context and a service process are processed. A process skip module is called in the method to specify a next step and execution time. That is, after this step, the method further includes: judging whether the target method is a last step of the target process instance; if NO, updating the target instance information based on a next step of the target method, and restoring the target instance information in the storage module.

After the target method is executed, the execution state of the target process instance is set to ready or waiting. The execution state needs to be set to the waiting state if an Application Programming Interface (API) of other service needs to be called asynchronously. That is, this step includes: searching, from the register, the target method corresponding to the step to be executed, setting an execution state of the target process instance to executing state, and executing the target method; during the execution of the target method, if another method needs to be called asynchronously, setting the execution state of the target process instance to a waiting state.

If it is indicated in the method that the process has been completed, the execution state needs to be set to complete, and if the process fails to be executed, the execution state needs to be set to the error state. The two states indicate that the process instance has been ended and may no longer be scheduled. That is, the present embodiment further includes: if the target method is the last step of the target process instance, judging whether the target method is executed successfully; if YES, setting an execution state of the target process instance to a completed state; if NO, setting the execution state of the target process instance to an error state.

If the process is interrupted due to a power failure or an error in the method (a condition is not satisfied, a resource fails to be locked, etc.), the process instance is set to the ready state, and this step is re-executed. This is a retry mechanism. That is, the present embodiment further includes: during the execution of the target method, if receiving an interrupt signal, setting the execution state of the target process instance to the ready state, and restoring the target instance information in the storage module.

In addition, call-back of other services may be monitored, call-back information is stored, and the target process instance is set to ready for next scheduling and execution.

According to the service processing method provided in the embodiment of the present application, the preset development specification defined in the register only serves a workflow, does not carry other characteristic functions, and is simple, feasible, and reliable. Codes developed according to the specification are highly readable and maintainable. A service rather than code layering is taken as a guidance, whereby a whole service process is clear and easy to understand, a retry mechanism, a concurrent and repeated scheduling prevention mechanism, and an interrupt mechanism may be satisfied, and relatively high extensibility is ensured.

An application embodiment provided in the present application will now be introduced. The intermediate platform may include the following modules: a service development specification, a scheduling module, an execution module, a call-back monitoring module, a process scanning module, a process skip module, and a process instance storage module.

The service development specification is configured to define a set of elements and rules so as to perform process compiling according to the rules and implement process configuration by coding. The scheduling module is configured to schedule and add a process instance into an execution queue and ensure beam queuing. The execution module is configured to execute a specific process instance. A process is usually executed through multiple steps, only one step is executed at one time, and an execution process and a skip record may be recorded in the instance storage module. The call-back monitoring module is mainly configured for asynchronous calling. For long-term task execution, it is necessary to call APIs of other service and wait for call-back notifications of the other service. This module provides multiple monitoring interfaces, and the other service calls different call-back interfaces. The module stores call-back information in the corresponding instance storage module. The process scanning module is configured for dynamic scanning and registration of processes for subsequent execution of process instances. The process skip module provides some public methods to, during writing of a service process, specify a next step to be executed of the process and modify a state of the process instance, execution time of the next step, etc., and such information is recorded in the storage module for the execution module to use subsequently. The process instance storage module is configured to store process instances, mainly including the following information: corresponding processes, context parameters, execution time of next steps, the next steps, execution states, call-back information, anomaly information, etc.

A service processing apparatus provided in the embodiments of the present application will be introduced below. The service processing apparatus described below may make corresponding references mutually with the service processing method described above.

Figure 2:
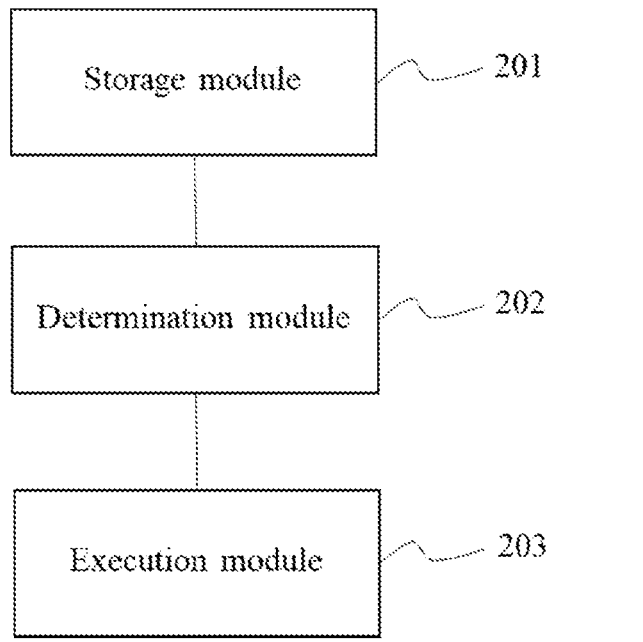
FIG. 2 is a structural diagram of a service processing apparatus according to an exemplary embodiment.

Referring to FIG. 2, a structural diagram of a service processing apparatus according to an exemplary embodiment is shown. As shown in FIG. 2, the apparatus includes:

a storage module 201, configured to, when receiving a UI request, create a process instance corresponding to the UI request, and storing instance information of the process instance in a storage module;

a determination module 202, configured to determine a target process instance from the storage module, and determine a step to be executed of the target process instance based on target instance information of the target process instance;

an execution module 203, configured to search, from a register, and execute a target method corresponding to the step to be executed, wherein the register includes all methods compiled according to a preset development specification.

According to the service processing apparatus provided in the embodiment of the present application, the preset development specification defined in the register only serves a workflow, does not carry other characteristic functions, and is simple, feasible, and reliable. Codes developed according to the specification are highly readable and maintainable. A service rather than code layering is taken as a guidance, whereby a whole service process is clear and easy to understand, a retry mechanism, a concurrent and repeated scheduling prevention mechanism, and an interrupt mechanism may be satisfied, and relatively high extensibility is ensured.

Based on the above-mentioned embodiment, as a preferred implementation mode, the apparatus further includes:

a first setting module, configured to set an execution state of the process instance to the ready state.

Correspondingly, the determination module 202 is specifically a module configured to determine the target process instance according to the execution state of the process instance in the storage module, and determine the step to be executed of the target process instance based on the target instance information of the target process instance.

Based on the above-mentioned embodiment, as a preferred implementation mode, the instance information includes execution time. The determination module 202 is specifically a module configured to determine a process instance whose execution state is the ready state and whose corresponding execution time is reached in the storage module as the target process instance, and determine the step to be executed of the target process instance based on the target instance information of the target process instance.

Based on the above-mentioned embodiment, as a preferred implementation mode, the apparatus further includes:

a judging module, configured to judge whether the target method is a last step of the target process instance, and if NO, start a working process of an updating module;

the updating module, configured to update the target instance information based on a next step of the target method, and restore the target instance information in the storage module.

Based on the above-mentioned embodiment, as a preferred implementation mode, the apparatus further includes:

a second setting module, configured to, if the target method is the last step of the target process instance, judge whether the target method is executed successfully; if YES, set an execution state of the target process instance to a completed state; if NO, set the execution state of the target process instance to an error state.

Based on the above-mentioned embodiment, as a preferred implementation mode, the execution module 203 includes:

an execution unit, configured to search, from the register, the target method corresponding to the step to be executed, set an execution state of the target process instance to the executing, and execute the target method;

a setting unit, configured to, during the execution of the target method, if another method needs to be called asynchronously, set the execution state of the target process instance to the waiting state.

Based on the above-mentioned embodiment, as a preferred implementation mode, the apparatus further includes:

a third setting module, configured to, during the execution of the target method, if receiving an interrupt signal, set the execution state of the target process instance to the ready state, and restoring the target instance information in the storage module.

With respect to the apparatus in the above-mentioned embodiment, specific manners that each module executes the operations have been described in detail in the embodiment about the apparatus, and will not be elaborated herein.

Figure 3:
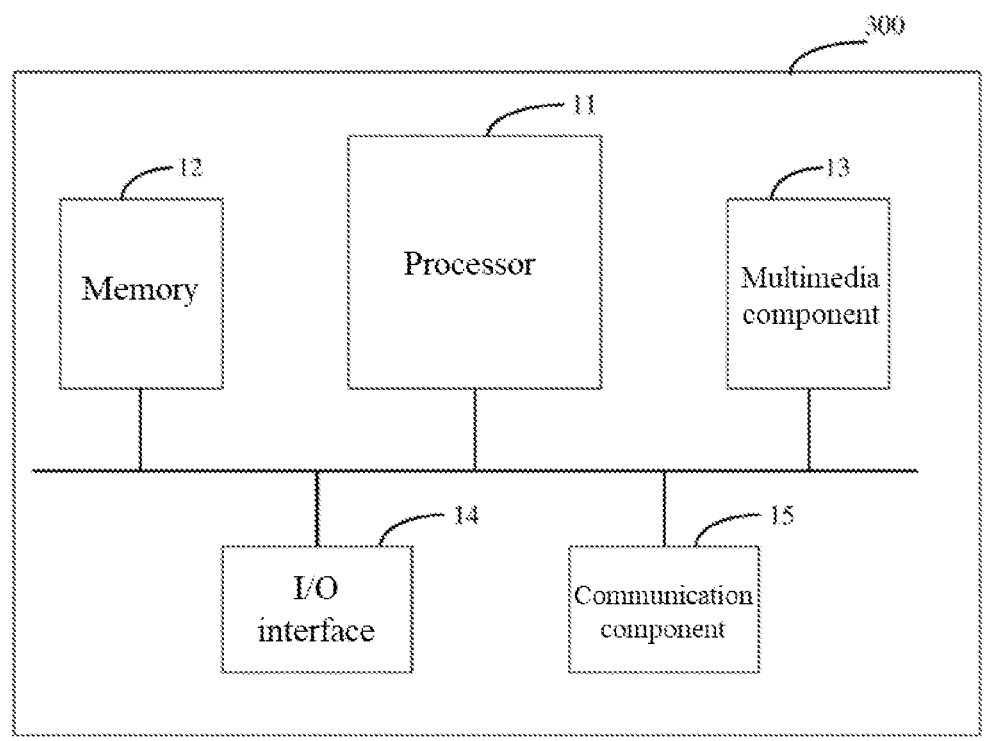
FIG. 3 is a structural diagram of an electronic device according to an exemplary embodiment.

The present application also provides an electronic device. Referring to FIG. 3, a structural diagram of an electronic device 300 according to an embodiment of the present application is shown. As shown in FIG. 3, the electronic device may include a processor 11 and a memory 12. The electronic device 300 may further include one or more of a multimedia component 13, an Input/Output (I/O) interface 14, and a communication component 15.

The processor 11 is configured to control overall operations of the electronic device 300 so as to complete all or part of the steps in the service processing method. The memory 12 is configured to store various types of data to support the operations of the electronic device 300. Examples of such data include instructions for any applications or methods operated on the electronic device 300, and data related to the applications, such as contact data, sent and received messages, pictures, audios, and videos. The memory 12 may be implemented by a volatile or nonvolatile storage device of any type or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk. The multimedia component 13 may include a screen and an audio component. The screen may be, for example, a touch screen. The audio component is configured to output and/or input an audio signal. For example, the audio component may include a microphone configured to receive an external audio signal. The received audio signal may further be stored in the memory 12 or sent by the communication component 15. The audio component further includes at least one speaker configured to output an audio signal. The I/O interface 14 provides an interface between the processor 11 and another interface module, such as a keyboard, a mouse, a button, etc. The button may be a virtual button or a physical button. The communication component 15 is configured for wired or wireless communication between the electronic device 300 and another device. The wireless communication is, for example, Wireless Fidelity (Wi-Fi), Bluetooth, Near Field Communication (NFC), $2^{nd}$-Generation (2G), 3rd-Generation (3G), 4th-Generation (4G), or a combination thereof, and thus the communication component 15 may correspondingly include a Wi-Fi module, a Bluetooth module, an NFC module, etc.

In an exemplary embodiment, the electronic device 300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, to execute the service processing method.

In another exemplary embodiment, there is also provided a computer-readable storage medium having program instructions stored thereon which, when executed by a processor, implement the steps of the service processing method. For example, the computer-readable storage medium may be the memory 12 including a program instruction that may be executed by the processor 11 of the electronic device 300 to complete the service processing method.

All the embodiments in this specification are described in a progressive manner. Contents mainly described in each embodiment are different from those described in other embodiments. Same or similar parts of all the embodiments refer to each other. For the apparatus disclosed in the embodiments, since it corresponds to the method disclosed in the embodiments, the description is relatively simple, and the relevant part can be referred to the description of the method part. It should be noted that for a person of ordinary skill in the art, several improvements and modifications can be made to the present application without departing from the principle of the present application, and these improvements and modifications also fall within the scope of protection of the claims of the present application.

It is also noted that in this specification, relationship terms such as first and second are used only to distinguish one entity or operation from another entity or operation, without necessarily requiring or implying any such actual relationship or order between those entities or operations. Moreover, terms "include" and "contain" or any other variation thereof is intended to cover nonexclusive inclusions, whereby a process, method, object, or device including a series of elements not only includes those elements but also includes other elements that are not clearly listed, or further includes elements intrinsic to the process, the method, the object, or the device Without further limitation, the elements defined by the statement "comprising a" do not preclude the existence of additional identical elements in the process, method, article, or apparatus that include said elements.

What is claimed is:

1. A service processing method, comprising:
   when receiving a UI request, creating a process instance corresponding to the UI request, and storing instance information of the process instance in a storage module;
   determining a target process instance from the storage module, and determining a step to be executed of the target process instance based on target instance information of the target process instance;
   searching, from a register, and executing a target method corresponding to the step to be executed, wherein the register comprises all methods compiled according to a preset development specification.

2. The service processing method according to claim 1, wherein after the creating a process instance corresponding to the UI request, the method further comprises:
   setting an execution state of the process instance to a ready state;
   correspondingly, the determining a target process instance from the storage module comprises:
   determining the target process instance according to the execution state of the process instance in the storage module.

3. The service processing method according to claim 2, wherein the instance information comprises execution time; and the determining the target process instance according to the execution state of the process instance in the storage module comprises:
   determining a process instance whose execution state is the ready state and whose corresponding execution time is reached in the storage module as the target process instance.

4. The service processing method according to claim 2, wherein after the searching, from a register, and executing a target method corresponding to the step to be executed, the method further comprises:
   in response to determining that the target method is not a last step of the target process instance, updating the target instance information based on a next step of the target method, and restoring the target instance information in the storage module.

5. The service processing method according to claim 4, further comprising:
   in response to determining that the target method is the last step of the target process instance and determining that the target method is executed successfully, setting an execution state of the target process instance to a completed state; and
   in response to determining that the target method is the last step of the target process instance and determining that the target method is not executed successfully, setting the execution state of the target process instance to an error state.

6. The service processing method according to claim 2, wherein the searching, from a register, and executing a target method corresponding to the step to be executed comprises:
   searching, from the register, the target method corresponding to the step to be executed, setting an execution state of the target process instance to an executing state, and executing the target method; and
   during the execution of the target method, in response to a need of calling another method asynchronously, setting the execution state of the target process instance to a waiting state.

7. The service processing method according to claim 6, further comprising:
   during the execution of the target method, in response to receiving an interrupt signal, setting the execution state of the target process instance to the ready state, and restoring the target instance information in the storage module.

8. An electronic device, comprising:
   a memory, configured to store a computer program; and
   a processor, configured to execute the computer program to implement operations comprising:
   when receiving a UI request, creating a process instance corresponding to the UI request, and storing instance information of the process instance in a storage module;
   determining a target process instance from the storage module, and determining a step to be executed of the target process instance based on target instance information of the target process instance;
   searching, from a register, and executing a target method corresponding to the step to be executed, wherein the register comprises all methods compiled according to a preset development specification.

9. The electronic device according to claim 8, wherein after the creating a process instance corresponding to the UI request, the operations further comprise:
   setting an execution state of the process instance to a ready state;
   correspondingly, the determining a target process instance from the storage module comprises:
   determining the target process instance according to the execution state of the process instance in the storage module.

10. The electronic device according to claim 9, wherein the instance information comprises execution time; and the determining the target process instance according to the execution state of the process instance in the storage module comprises:
    determining a process instance whose execution state is the ready state and whose corresponding execution time is reached in the storage module as the target process instance.

11. The electronic device according to claim 9, wherein after the searching, from a register, and executing a target method corresponding to the step to be executed, the operations further comprise:
    in response to determining that the target method is not a last step of the target process instance, updating the target instance information based on a next step of the target method, and restoring the target instance information in the storage module.

12. The electronic device according to claim 11, wherein the operations further comprise:
    in response to determining that the target method is the last step of the target process instance and determining that the target method is executed successfully, setting an execution state of the target process instance to a completed state; and
    in response to determining that the target method is the last step of the target process instance and determining that the target method is not executed successfully, setting the execution state of the target process instance to an error state.

13. The electronic device according to claim 9, wherein the searching, from a register, and executing a target method corresponding to the step to be executed comprises:
- searching, from the register, the target method corresponding to the step to be executed, setting an execution state of the target process instance to an executing state, and executing the target method; and
- during the execution of the target method, in response to a need of calling another method asynchronously, setting the execution state of the target process instance to a waiting state.

14. The electronic device according to claim 9, wherein the operations further comprise:
- during the execution of the target method, in response to receiving an interrupt signal, setting the execution state of the target process instance to the ready state, and restoring the target instance information in the storage module.

15. A non-transitory computer-readable storage medium, having a computer program stored thereon which, when executed by a processor, causes the processor to implement operations comprising:
- when receiving a UI request, creating a process instance corresponding to the UI request, and storing instance information of the process instance in a storage module;
- determining a target process instance from the storage module, and determining a step to be executed of the target process instance based on target instance information of the target process instance;
- searching, from a register, and executing a target method corresponding to the step to be executed, wherein the register comprises all methods compiled according to a preset development specification.

16. The non-transitory computer-readable storage medium according to claim 15, wherein after the creating a process instance corresponding to the UI request, the operations further comprise:
- setting an execution state of the process instance to a ready state;
- correspondingly, the determining a target process instance from the storage module comprises:
- determining the target process instance according to the execution state of the process instance in the storage module.

17. The non-transitory computer-readable storage medium according to claim 16, wherein the instance information comprises execution time; and the determining the target process instance according to the execution state of the process instance in the storage module comprises:
- determining a process instance whose execution state is the ready state and whose corresponding execution time is reached in the storage module as the target process instance.

18. The non-transitory computer-readable storage medium according to claim 16, wherein after the searching, from a register, and executing a target method corresponding to the step to be executed, the operations further comprise:
- in response to determining that the target method is not a last step of the target process instance, updating the target instance information based on a next step of the target method, and restoring the target instance information in the storage module.

19. The non-transitory computer-readable storage medium according to claim 18, wherein the operations further comprise:
- in response to determining that the target method is the last step of the target process instance and determining that the target method is executed successfully, setting an execution state of the target process instance to a completed state; and
- in response to determining that the target method is the last step of the target process instance and determining that the target method is not executed successfully, setting the execution state of the target process instance to an error state.

20. The non-transitory computer-readable storage medium according to claim 16, wherein the searching, from a register, and executing a target method corresponding to the step to be executed comprises:
- searching, from the register, the target method corresponding to the step to be executed, setting an execution state of the target process instance to an executing state, and executing the target method; and
- during the execution of the target method, in response to a need of calling another method asynchronously, setting the execution state of the target process instance to a waiting state.

* * * * *